United States Patent [19]

Salim

[11] 4,416,309
[45] Nov. 22, 1983

[54] INDEXED PIPE

[76] Inventor: Hamid Salim, 6898 Bowie Rd., Cambridge, Ohio 43725

[21] Appl. No.: 385,554

[22] Filed: Jun. 7, 1982

[51] Int. Cl.³ .......................... F16L 9/00; F16L 55/00
[52] U.S. Cl. ........................................ 138/104; 138/97
[58] Field of Search .......................... 138/104, 178, 97; 33/494

[56] References Cited

U.S. PATENT DOCUMENTS

| 1,235,801 | 8/1917 | Hornig | 33/494 |
| 2,248,967 | 7/1941 | Curcio | 33/494 |
| 2,449,265 | 9/1948 | Williams | 138/178 |

FOREIGN PATENT DOCUMENTS

| 152220 | 1/1938 | Austria | 138/104 |
| 219691 | 2/1942 | Switzerland | 33/494 |

Primary Examiner—John W. Shepperd
Attorney, Agent, or Firm—Richard L. Miller

[57] ABSTRACT

An indexed pipe made of Polyvinyl Chloride, Cast or Ductile Iron, Clay, or Asbestos Cement that is buried in the ground or totally enclosed and requires access. The indexed pipe is marked in any accepted system of measurement, such as feet or meters, which would reveal pipe end locations during an excavation.

5 Claims, 5 Drawing Figures

INDEXED PIPE

BACKGROUND OF THE INVENTION

This invention deals with pipe, and more particularly with an indexed pipe utilizing marked reference systems for indexing.

Pipes of all sizes and types, such as: Poly Vinyl Chloride, Cast or Ductile Iron, Steel, Clay, or asbestos cement, are currently buried in the ground or totally enclosed and require maintenance. Such pipes are extensively used in the fields of water supply, sewerage, and transmission of other liquids and gases.

Ductile Cast Iron Pipe is commercially available in standard lengths of 18 feet, 3 inches. The pipes, laid end to end, are joined by inserting the plain-end of one length of pipe into the bell-end of another, and buried in the ground at varying depths, depending upon local codes, climatic and other considerations.

When a section of pipe is dug up and exposed for purposes of repairing, installing a service tap, installing a valve, tee or any other fitting, the usual procedure is to cut out the required section of pipe and substitute it with the appropriate replacement. Couplings are used to secure the replacement in position.

Use of two clamps, couplings or collars is unavoidable in the substitution of the replaced section. Such clamps are very expensive and require significant man-hours of skilled labor to install.

Use of two clamps involves extra joints where the piping may separate due to excessive earth movement or unequal settlement, resulting in an emergency situation. In addition, the use of two clamps also means extra joints where leakage may occur, resulting in increased product losses or infiltration of ground water in sanitary sewer systems. In either case, such leaks represent increased monetary costs, in terms of product losses or higher operational costs.

Further, extra skilled labor costs are required in the preparation and installation of two clamps.

By marking the pipe in any accepted system of measurement, such as feet or meters, the economics and savings would be realized, since it would be possible to know the lengths of the various sections of the pipes involved. When the replacement is close to either of the original joints of the pipe, it would be economical to substitute a length of pipe from the replacement to the closer of the two original pipe joints, thereby utilizing only one repair collar or clamp rather than two.

Ordinarily, while making a wet service tap, a small excavation is initially made to reveal the pipe. This excavation is then enlarged to accommodate the workers. The markings on the pipe would indicate the direction in which the excavation should be enlarged to reveal an adjoining pipe-end.

Under certain circumstances, some pipes develop longitudinal cracks if a hole for the service tap in the pipe sidewall is drilled too close to the end of the pipe section. Thus, if the markings on the pipe indicate that the initial excavation is too close to the pipe end, then the excavation would be directed towards the center of the pipe, away from the joint.

In many instances, due to varying soil conditions, water from a damaged pipe joint may not surface at that point. It may travel along the pipe and surface some distance away from the point from which it actually escapes. Normally, an initial excavation is made at the point where the water is surfacing. If the leak is not revealed, the markings on the pipe would indicate the direction in which the excavation should be enlarged to reveal the pipe joint.

Searching for an elusive leak location is, at best, a frustrating and time consuming operation, and especially so when working conditions are unfavorable. Maintenance personnel need as much help as possible to eliminate probable problem points quickly and effectively before proceeding with further investigations. Indexed pipe would eliminate uncertainty about the location of each adjoining joint, facilitate the decision making process, increase productivity and reduce losses and downtime.

Significant savings would be realized if individual sections of buried or concealed piping systems were indexed to reveal the location of original joints within the piping system by exposing any portion of the pipe. The indexing provides a viable and vital option to the maintenance personnel by aiding in evaluating various maintenance alternatives quickly and allowing maintenance personnel to adopt the most economical approach. The indexing helps in conserving vital resources and contributes to the enhancement of overall system efficiency.

SUMMARY OF THE INVENTION

Accordingly, it is an object of the present invention to provide an indexed pipe.

A further object of the present invention is to provide an indexed pipe having a rigid, hollow, cylindrical geometric shape and reference scales.

Another object of the present invention is to provide an indexed pipe having reference scales running along the longitudinal axis of the rigid, hollow, cylindrical, geometric shape.

Still a further object of the present invention is to provide an indexed pipe whose reference scales converge and diverge from their center lines.

Yet another object of the present invention is to provide an indexed pipe whose scale markings are simple numeric, and could have alpha suffixes, but are definitely followed by respective pointing arrows.

Still a further object of the present invention is to provide an indexed pipe whose scale markings are simple numeric, and could have alpha suffixes, but are definitely followed by respective pointing arrows.

And yet still a further object of the present invention is to provide an indexed pipe whose reference scales begin and terminate at the ends of the rigid, hollow, cylindrical, geometric shape and run in opposite directions along the longitudinal axis.

Briefly, in accordance with the present invention, there is provided an indexed pipe which is of the rigid, hollow, cylindrical, geometric shape having reference scales, made up of numerics and possible alphas and definitely arrows, running along its longitudinal axis.

The foregoing objects, features and advantages of the invention will, in part, be pointed out with particularity and will, in part, become obvious from the following more detailed description of the invention, taken in conjunction with the accompanying drawing, which forms an integral part thereof.

BRIEF DESCRIPTION OF THE DRAWINGS

In the drawings.

In the various figures of the drawing, like reference characters designate like parts.

DESCRIPTION OF THE PREFERRED EMBODIMENTS

Figure 1:
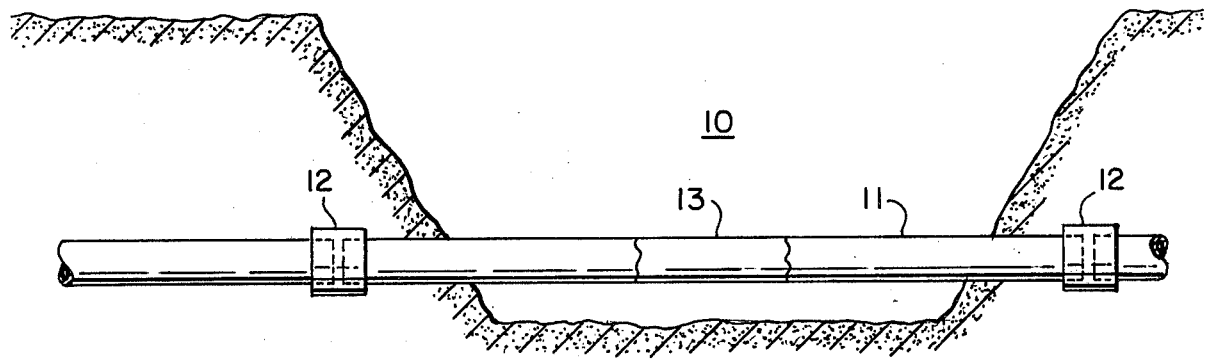
FIG. 1 is a cross sectional view of an excavation revealing a pipe with a problem area.

Referring now to FIG. 1, the original pipe 11, having coupled joint ends 12 requiring a replacement section 13, is exposed by excavation 10.

Figure 2:
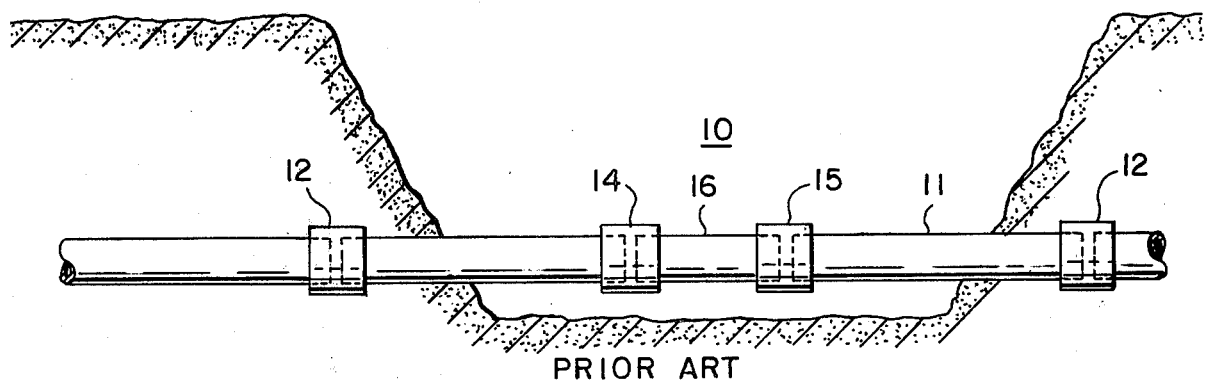
FIG. 2 is a cross sectional view of an excavation showing the method of repairing the damaged pipe utilizing conventional pipe in the original excavation site of FIG. 1.

The conventional way of instituting a replacement, by way of example, can best be described with respect to FIG. 2. Replacement section 16 is spliced into pipe 11 by the use of couplings 14 and 15.

Figure 3:
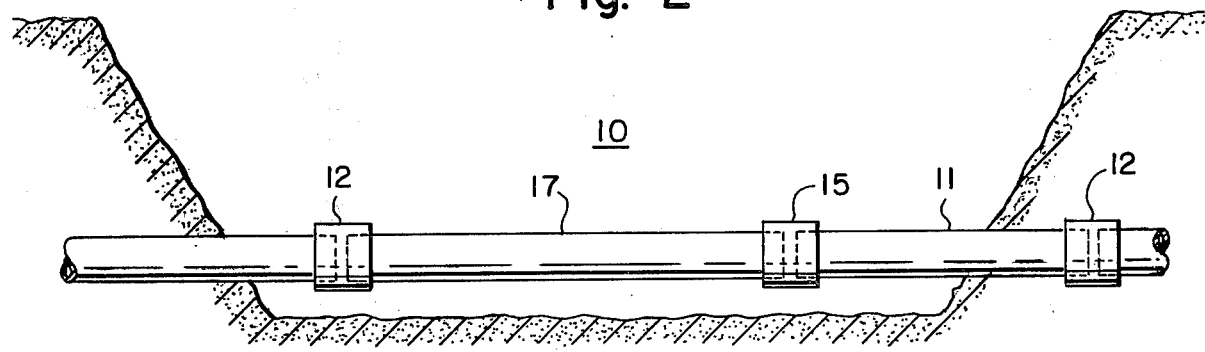
FIG. 3 is a cross sectional view of an excavation showing the method of repairing the damaged pipe utilizing the present invention in the original excavation site of FIG. 1.
Figure 4:
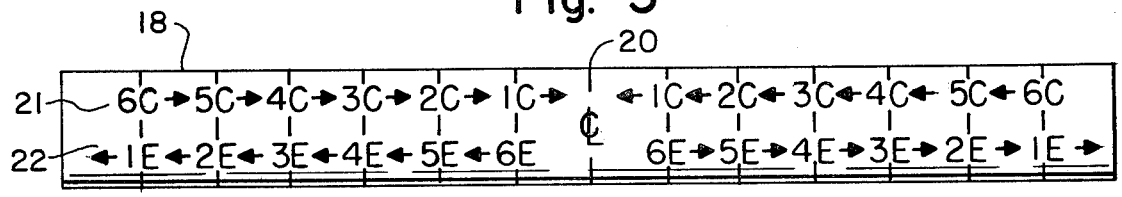
FIG. 4 is a plain view of a marking system for use in repairing the damaged pipe of FIG. 1.
Figure 5:
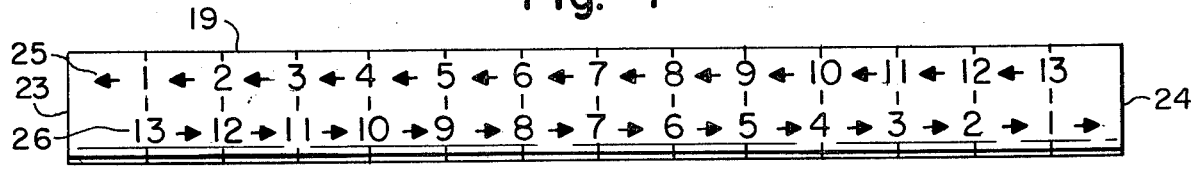
FIG. 5 is a plain view of a second embodiment of the present invention for use in repairing the damaged pipe of FIG. 1.

The use of indexed pipe for instituting a replacement, by way of example, can best be described with respect to FIGS. 3, 4, and 5. In FIG. 3, excavation 10 is widened to reveal coupled joint end 12. FIGS. 4, and 5 show indexed pipes 18 and 19. The indexed pipes 18, and 19 yield a reference system that allows for immediate location of the pipe joint end 12, knowledge which is needed for splicing. Again, in FIG. 3, once pipe end 12 is exposed, replacement section 17 is spliced into pipe 11 by the use of coupling 15 and original joint end coupling 12.

In further detail, the indexed pipe 18 of FIG. 4 reveals a reference system from the pipe center line 20. Scale 21 converges on the pipe center line 20 while scale 22 diverges from the pipe center line 20. An alternative indexed pipe of FIG. 5 reveals a reference system from pipe ends 23 and 24. Scale 25 decreases from pipe end 24 while scale 26 decreases from pipe end 23.

It should be noted that when a section of pipe is dug up and exposed for purposes of repairing, installing a service tap, inserting a valve, tee, or any other fitting, the indexed reference will locate the nearest original end joint in the pipe line.

Although particular types of materials have been mentioned, it is understood that substitutions for these materials can also be utilized as long as they carry out the features of the invention.

There has been disclosed heretofore the best embodiment of the invention presently contemplated. However, it is to be understood that various changes and modifications may be made thereto without departing from the spirit of the invention.

I claim:

1. An indexed underground type pipe, comprising: a rigid hollow cylindrical geometric shaped pipe section for burial underground, a connection means at each end of said pipe section for underground connection to another pipe section, a first references scale longitudinally marked along said pipe section, a second reference scale longitudinally marked along said pipe section adjacent to and parallel with said first reference scale whereby a small excavation through the ground to expose a portion of said pipe section will reveal both said first and second reference scales, said first reference scale comprising a first series of numeric indications and a first indication means associated with each of said first numeric indications for referencing each of said first numeric indications to at least one particular point on said pipe section, said second reference scale comprising a second series of numeric indications complementary to said first series of numeric indications and a second indicating means associated with each of said second numeric indications for referencing each of said second series to at least one particular point on said pipe section, whereby the first and second numeric designations and their associated indicating means exposed by the small excavation provides identification of the longitudinal extent to both ends of said pipe section.

2. An indexed pipe as in claim 1, wherein said first series of numeric indications run sequentially from one end of said pipe section, said first indicating means references said first series to said one end, said second series of numeric indications run sequentially from the other end of said pipe section, and said second indicating means references said second series to said other end.

3. An indexed pipe as in claim 1, wherein said first series of numeric indications converge to a center line of said pipe section, said firsts indicating means references said first series to the center line of the pipe section, said second series of numeric indications diverge from the center line and said second indicating means references all of said second series on one side of the center line to one end of said pipe section, and all of said second series on the other side of the center line to the other end of said pipe section.

4. An indexed pipe as in claim 3, wherein said first indicating means includes an arrow and a letter "C", and said second indicating means include an arrow and a letter "E".

5. An indexed pipe as in claim 1, wherein said first and second reference scale have markings that are simple, numeric, and followed by arrows pointing in a particular direction.

* * * * *